United States Patent
Ogawa et al.

(10) Patent No.: US 11,588,714 B2
(45) Date of Patent: Feb. 21, 2023

(54) WEB QUALITY ESTIMATION APPARATUS AND PROGRAM

(71) Applicant: Nippon Telegraph and Telephone Corporation, Tokyo (JP)

(72) Inventors: Hideki Ogawa, Musashino (JP); Taichi Kawano, Musashino (JP); Daisuke Ikegami, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/434,923

(22) PCT Filed: Feb. 21, 2020

(86) PCT No.: PCT/JP2020/007113
§ 371 (c)(1),
(2) Date: Aug. 30, 2021

(87) PCT Pub. No.: WO2020/179508
PCT Pub. Date: Sep. 10, 2020

(65) Prior Publication Data
US 2022/0131777 A1   Apr. 28, 2022

(30) Foreign Application Priority Data
Mar. 1, 2019  (JP) .............................. JP2019-037642

(51) Int. Cl.
*H04L 43/08* (2022.01)
*H04L 41/5009* (2022.01)

(52) U.S. Cl.
CPC .......... *H04L 43/08* (2013.01); *H04L 41/5009* (2013.01)

(58) Field of Classification Search
CPC ... H04L 43/08; H04L 41/5009; H04L 41/147; G06F 13/00; G06Q 50/10
See application file for complete search history.

(56) References Cited

U.S. PATENT DOCUMENTS

| | | | | |
|---|---|---|---|---|
| 10,027,739 | B1 * | 7/2018 | Krishnan | H04L 67/60 |
| 2002/0099818 | A1 * | 7/2002 | Russell | H04L 67/02 |
| | | | | 709/224 |
| 2009/0040927 | A1 * | 2/2009 | Tsun | H04L 41/509 |
| | | | | 370/232 |

FOREIGN PATENT DOCUMENTS

JP   2016134008   7/2016

OTHER PUBLICATIONS

Li et al., "WebProphet: Automating Performance Prediction for Web Services," Proceedings of the 7th USENIX Conference on Networked Systems Design and Implementation, Apr. 28, 2010, pp. 1-16.

* cited by examiner

*Primary Examiner* — Joe Chacko
(74) *Attorney, Agent, or Firm* — Fish & Richardson P.C.

(57) ABSTRACT

An object is to provide possible web quality estimation for changes in network quality without simulating each combination of network qualities or acquiring operation log information in advance. One aspect of the present invention is a web quality estimation device that estimates web quality which is a processing time of a web content, based on input of a content identifier of the web content and one or more network qualities, and includes: a content characteristic storage unit that stores correspondence information between a content identifier for identifying a web content and one or more content characteristics for a plurality of web contents; and a web quality estimation unit that receives input of a content identifier and one or more network qualities, refers to the corresponding information to acquire one or more content characteristics corresponding to the input content identifier, and estimates web quality from the one or more content characteristics and the input one or more network qualities.

8 Claims, 6 Drawing Sheets

WEB QUALITY ESTIMATION DEVICE

WEB QUALITY ESTIMATION DEVICE

WEB QUALITY ESTIMATION APPARATUS AND PROGRAM

CROSS-REFERENCE TO RELATED APPLICATIONS

This application is a National Stage application under 35 U.S.C. § 371 of International Application No. PCT/JP2020/007113, having an International Filing Date of Feb. 21, 2020, which claims priority to Japanese Application Serial No. 2019-037642, filed on Mar. 1, 2019. The disclosure of the prior application is considered part of the disclosure of this application, and is incorporated in its entirety into this application.

TECHNICAL FIELD

The present invention relates to a web quality estimation device and a program.

BACKGROUND ART

With advanced communication networks and sophisticated devices, a large variety of services and contents are being provided via the Internet. Among them, web content is now provided including not only entertainment-related, but also business-related, which has become indispensable to our lives.

It is known that the processing time of web content (hereinafter referred to as web quality) has a strong correlation with the user experience quality. Further, in terms of web quality, improvement of network quality is important because the transfer time on the network accounts for a large proportion. Therefore, in order to satisfy the web quality that allows the user to comfortably use web content, it is required to clarify the relationship between the web quality and the network quality. Therefore, it is important to estimate the web quality so that a change in the web quality due to a change in the network quality can be grasped.

In a conventional web quality estimation, dependency relationships between objects that make up a web page and operation log information of the page as operated are acquired, and latency, which is one of the network qualities, is used (NPL 1).

Further, in another web quality estimation, object groups to be processed at the same time is estimated based on an operation log measured in advance, and the processing time when two network qualities of latency and throughput change for each object group is calculated (PTL 1).

CITATION LIST

Patent Literature

[PTL 1] Japanese Unexamined Patent Publication No. 2016-134008

Non Patent Literature

[NPL 1] Zhi chun Li, Ming Zhang, Zhao sheng Zhu, Yan Chen, Albert Greenberg, and Yi-Min Wang. WebProphet: Automating Performance Prediction for Web Services. In Proceedings of the 7th USENIX Conference on Networked Systems Design and Implementation, pp. 10-10, 2010.

SUMMARY OF THE INVENTION

Technical Problem

In a real network, different throughput environments are mixed, and the degree of influence of throughput on web quality is large, but in NPL 1, throughput is not taken into consideration. Therefore, there is a problem in the accuracy of web quality estimation in application to the actual environment.

On the other hand, in PTL 1, latency and throughput are taken into consideration as network qualities, but as in NPL 1, web quality is estimated by network quality simulation based on operation log information measured in advance. This method is of simulating the transfer time for each of the objects or object groups that make up a web page to calculate the web quality, which requires high calculation cost. In addition, the current web contents often change from day to day, and thus there is a problem that it is necessary to measure the operation log every time the content changes, which requires high cost for measurement.

The present invention has been made in view of the foregoing, and an object of the present invention is to provide possible web quality estimation for changes in network quality without simulating each combination of network qualities or acquiring operation log information in advance.

Means for Solving the Problem

In order to solve the above problem, one aspect of the present invention is a web quality estimation device that estimates web quality, which is a processing time of a web content, based on input of a content identifier of the web content and one or more network qualities, and includes:

a content characteristic storage unit that stores correspondence information between a content identifier for identifying a web content and one or more content characteristics for a plurality of web contents; and a web quality estimation unit that receives input of a content identifier and one or more network qualities, refers to the corresponding information to acquire one or more content characteristics corresponding to the input content identifier, and estimates web quality from the one or more content characteristics and the input one or more network qualities.

Another aspect of the present invention is a web quality estimation device that estimates web quality, which is a processing time of a web content, based on input of a content feature value of the web content and one or more network qualities, and includes:

a content characteristic estimation unit that estimates one or more content characteristics from one or more content feature values; and a web quality estimation unit that estimates web quality from the one or more content characteristics and the one or more network qualities.

Still another aspect of the present invention is a web quality estimation device that estimates web quality, which is a processing time of a web content, and a similar web content based on input of a content feature value of the web content and one or more network qualities, and includes:

a content characteristic estimation unit that estimates one or more content characteristics from one or more content feature values;

a web quality estimation unit that estimates web quality from the one or more content characteristics and the one or more network qualities;

a content characteristic storage unit that stores correspondence information between a content identifier for identifying a web content and one or more content characteristics for a plurality of web contents; and a similar web content estimation unit that acquires one or more content characteristics as input, calculates a similarity between the one or more content characteristics of each web content stored in the content characteristic storage unit and the acquired content characteristics, and outputs a group of content identifiers of web contents having the similarity equal to or higher than a threshold value.

Effects of the Invention

According to the present invention, it is possible to estimate web quality without needing to acquire a communication log or a dependency relationship between objects making up a web content even when the web content changes from day to day.

DESCRIPTION OF EMBODIMENTS

Various embodiments of the present invention will be described in the following examples.

Figure 1:
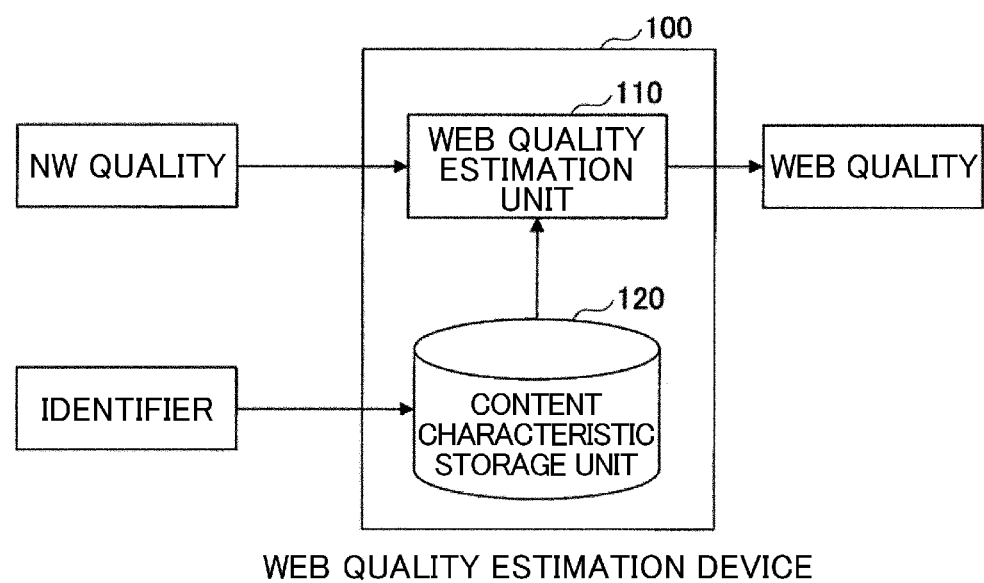
FIG. 1 is a diagram illustrating a functional configuration example of a web quality estimation device according to a first embodiment of the present invention.

First, a web quality estimation device according to a first embodiment of the present invention will be described with reference to FIGS. 1 and 2. FIG. 1 is a diagram illustrating a functional configuration example of the web quality estimation device according to the first embodiment of the present invention.

As illustrated in FIG. 1, a web quality estimation device 100 includes a web quality estimation unit 110 and a content characteristic storage unit 120.

The content characteristic storage unit 120 stores in advance correspondence information (e.g., in a table format) indicating a content identifier for identifying each content and a set of one or more content characteristics corresponding to the content identifier. Then, when the content characteristic storage unit 120 acquires the content identifier as input, the content characteristic storage unit 120 refers to the correspondence information to output the content characteristic corresponding to the acquired content identifier. For a website, a unit for identifying the content identifier is one page or the like that makes up the site, and corresponds to, but not limited to, a URI (Uniform Resource Identifier) (e.g.: https://www.xxx.co.jp/) of a web page. Further, the content characteristic includes one or more numerical values, which are, but not limited to, numerical values indicating latency, throughput, a degree of influence from changes in terminal processing, and the like.

The web quality estimation unit 110 acquires one or more network qualities and one or more content characteristics as input, and estimates a web quality (y). For example, the network quality may be a network latency, a throughput, a jitter, or a loss. Here, estimation is performed based on the characteristic that the web quality (y) has a linear relationship with each of a round-trip latency ($x_1$) in end-to-end as a network quality and the reciprocal of a throughput ($x_2$) which is a transfer amount per unit time in end-to-end, for example as in the following equation.

$$y = c_1 x_1 + c_2 \frac{1}{x_2} + c_3 \qquad \text{[Formula 1]}$$

where $c_1$, $c_2$, and $c_3$ are content characteristics obtained by inputting a content identifier into the content characteristic storage unit 120. Further, the equation presented here is an example, and any equation not limited to the above equation may be used as long as it takes into account the relationship between the network quality and the web quality. In that case, the number of parameters representing the content characteristic may be increased or decreased.

Next, a procedure of web quality processing performed by the web quality estimation device 100 according to the first embodiment of the present invention will be described. FIG. 2 is a flowchart illustrating the procedure of the web quality processing procedure performed by the web quality estimation device 100.

Figure 2:
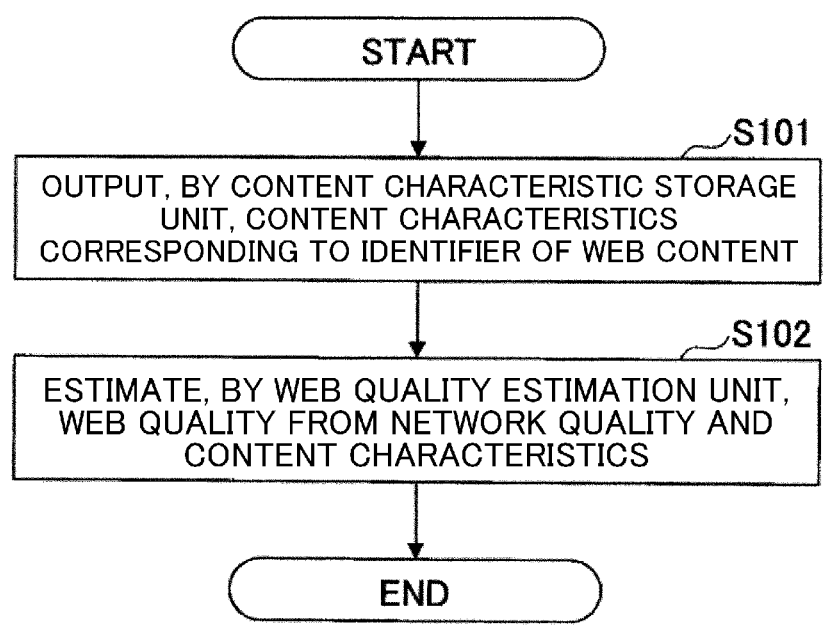
FIG. 2 is a flowchart illustrating web quality estimation processing according to the first embodiment of the present invention.

As illustrated in FIG. 2, in step S101, the content characteristic storage unit 120 acquires, as input, the content identifier of a web content to be estimated, and outputs one or more content characteristics corresponding to the content identifier acquired based on the correspondence information stored in advance.

In step S102, when the web quality estimation unit 110 acquires, as input, the one or more content characteristics and one or more network qualities output from the content characteristic storage unit 120, the web quality estimation unit 110 uses, for example, the above-described equation or the like to estimate web quality.

Figure 3:
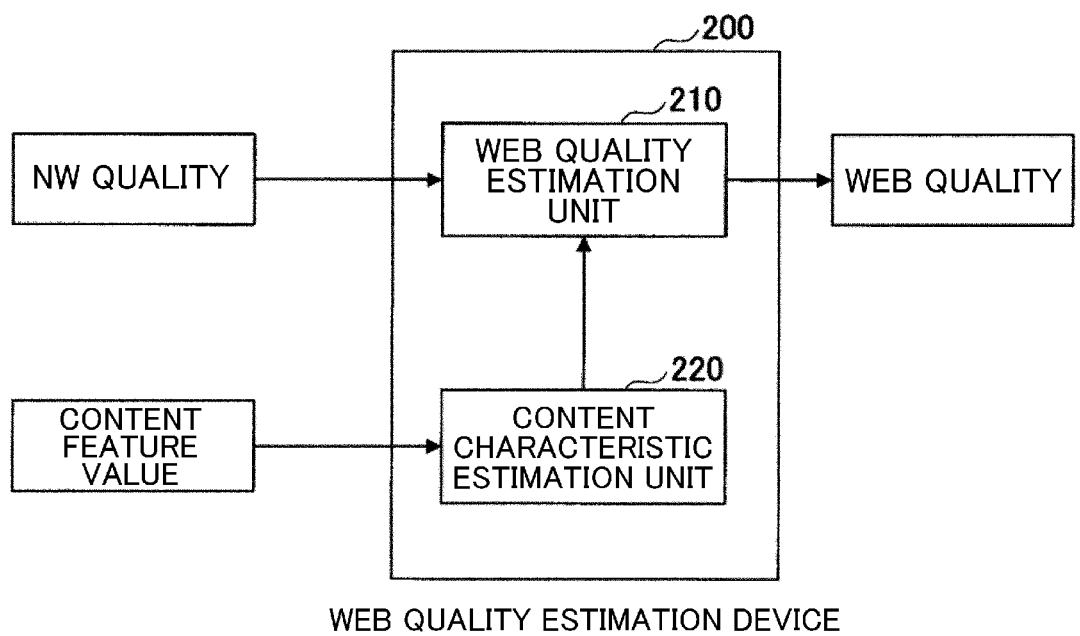
FIG. 3 is a diagram illustrating a functional configuration example of a web quality estimation device according to a second embodiment of the present invention.

Next, a web quality estimation device according to a second embodiment of the present invention will be described with reference to FIGS. 3 and 4. FIG. 3 is a diagram illustrating a functional configuration example of the web quality estimation device according to the second embodiment of the present invention.

As illustrated in FIG. 3, a web quality estimation device 200 includes a web quality estimation unit 210 and a content characteristic estimation unit 220.

The content characteristic estimation unit 220 acquires one or more content feature values as input, and estimates content characteristics from the acquired content feature values by using any estimation method of deriving one or more content characteristics from content feature values. The estimation method used herein corresponds to a multiple regression equation or a non-linear regression method such as an exponential function or SVR (Support Vector Regression). However, any method, not limited to the above estimation method, may be used as long as it utilizes a relationship between a content feature value and a content characteristic. Further, the content feature value includes, but is not limited to, the number of javascript, the number of css (Cascading Style Sheet), the number of images, the number of domains, the total number of requests, the total reception size, and the like. These content feature values may be acquired from a browser standard API (Application Programming Interface), packet capture data, or the like. Further, the content characteristic includes one or more numerical values, which are, but not limited to, numerical values indicating latency, throughput, a degree of influence from changes in terminal processing, and the like.

The web quality estimation unit 210 acquires one or more network qualities and one or more content characteristics as input, and estimates a web quality (y). For example, the network quality may be a network latency, a throughput, a jitter, or a loss. Here, estimation is performed based on the characteristic that the web quality (y) has a linear relationship with each of a round-trip latency ($x_1$) in end-to-end as a network quality and the reciprocal of a throughput ($x_2$) which is a transfer amount per unit time in end-to-end, for example as in the following equation.

$$y = c_1 x_1 + c_2 \frac{1}{x_2} + c_3 \qquad \text{[Formula 2]}$$

where $c_1$, $c_2$, and $c_3$ are content characteristics obtained by inputting one or more content feature values into the content characteristic estimation unit 220. Further, the equation presented here is an example, and any equation not limited to the above equation may be used as long as it takes into account the relationship between the network quality and the web quality. In that case, the number of parameters representing the content characteristic may be increased or decreased.

Next, a procedure of web quality processing performed by the web quality estimation device 200 according to the second embodiment of the present invention will be described. FIG. 4 is a flowchart illustrating the procedure of the web quality processing procedure performed by the web quality estimation device 200.

Figure 4:
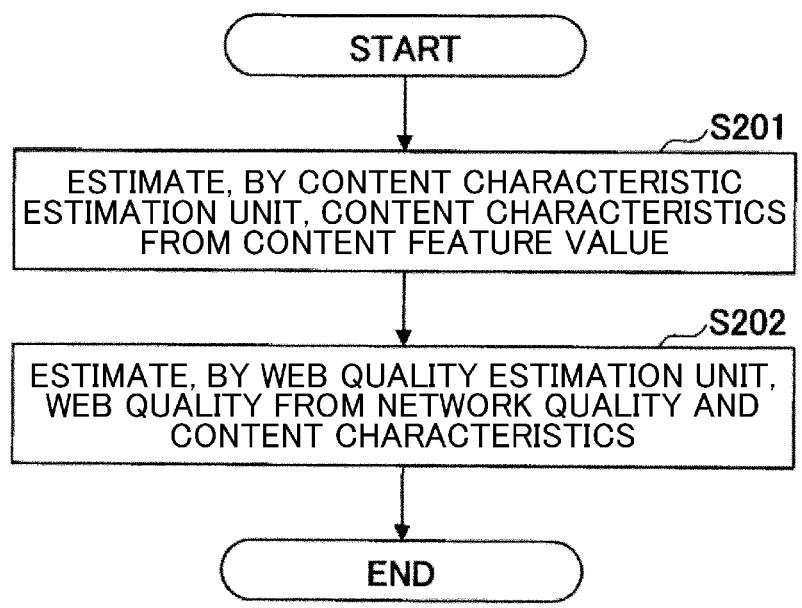
FIG. 4 is a flowchart illustrating web quality estimation processing according to the second embodiment of the present invention.

As illustrated in FIG. 4, in step S201, the content characteristic estimation unit 220 acquires, as input, the content feature value of a web content to be estimated, and estimates one or more content characteristics from the acquired content feature value by using a function stored in advance.

In step S202, when the web quality estimation unit 210 acquires, as input, the one or more content characteristics and one or more network qualities output from the content characteristic estimation unit 220, the web quality estimation unit 110 uses, for example, the above-described equation or the like to estimate web quality.

Figure 5:
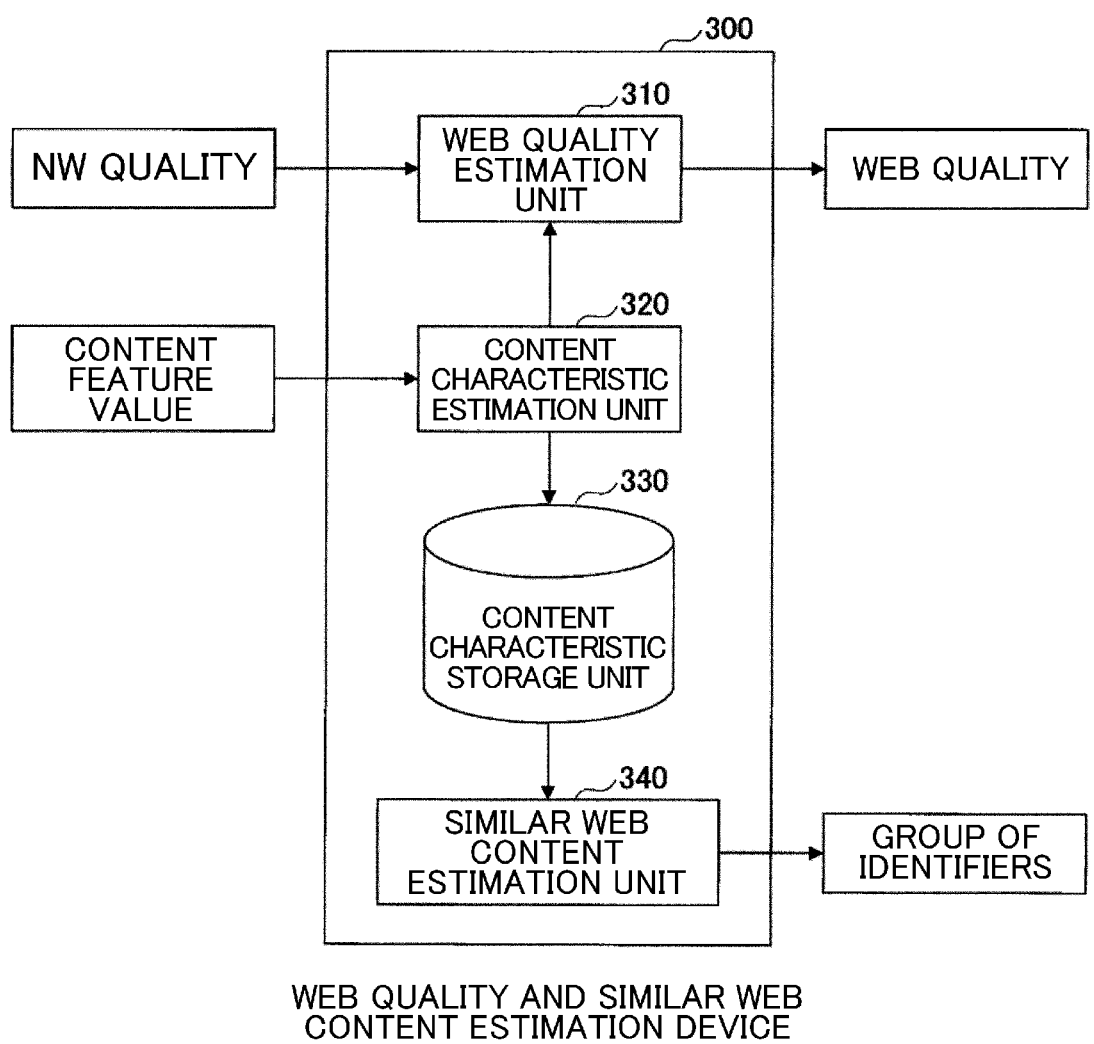
FIG. 5 is a diagram illustrating a functional configuration example of a web quality estimation device according to a third embodiment of the present invention.

Next, a web quality estimation device according to a third embodiment of the present invention will be described with reference to FIGS. 5 and 6. FIG. 5 is a diagram illustrating a functional configuration example of the web quality estimation device according to the third embodiment of the present invention.

As illustrated in FIG. 5, the web quality estimation device 300 includes a web quality estimation unit 310, a content characteristic estimation unit 320, a content characteristic storage unit 330, and a similar web content estimation unit 340.

The content characteristic estimation unit 320 acquires one or more content feature values as input, and estimates content characteristics from the acquired content feature values by using any estimation method of deriving one or more content characteristics from content feature values. The estimation method used herein corresponds to a multiple regression equation or a non-linear regression method such as an exponential function or SVR (Support Vector Regression). However, any method, not limited to the above estimation method, may be used as long as it utilizes a relationship between a content feature value and a content characteristic. Further, the content feature value includes, but is not limited to, the number of javascript, the number of css (Cascading Style Sheet), the number of images, the number of domains, the total number of requests, the total reception size, and the like. These content feature values may be acquired from a browser standard API (Application Programming Interface), packet capture data, or the like. Further, the content characteristic includes one or more numerical values, which are, but not limited to, numerical values indicating latency, throughput, a degree of influence from changes in terminal processing, and the like.

The web quality estimation unit 310 acquires one or more network qualities and one or more content characteristics as input, and estimates a web quality (y). For example, the network quality may be a network latency, a throughput, a jitter, or a loss. Here, estimation is performed based on the characteristic that the web quality (y) has a linear relationship with each of a round-trip latency ($x_1$) in end-to-end as a network quality and the reciprocal of a throughput ($x_2$) which is a transfer amount per unit time in end-to-end, for example as in the following equation.

$$y = c_1 x_1 + c_2 \frac{1}{x_2} + c_3 \qquad \text{[Formula 3]}$$

where $c_1$, $c_2$, and $c_3$ are content characteristics obtained by inputting one or more content feature values into the content characteristic estimation unit 220. Further, the equation presented here is an example, and any equation not limited to the above equation may be used as long as it takes into account the relationship between the network quality and the web quality. In that case, the number of parameters representing the content characteristic may be increased or decreased.

The content characteristic storage unit 330 stores in advance correspondence information (e.g., in a table format) indicating a content identifier for identifying each content and a set of one or more content characteristics corresponding to the content identifier, for each content. When acquiring the content identifier as input, the content characteristic storage unit 330 refers to the corresponding information to output the content characteristics corresponding to the acquired content identifier. For a website, a unit for identifying the web content is one page or the like that makes up the site, and corresponds to, but not limited to, a URI (e.g.: https://www.xxx.co.jp/) of a web page.

When the similar web content estimation unit 340 acquires, as input, the content characteristics estimated by the content characteristic estimation unit 320, the similar web content estimation unit 340 calculates a similarity between the content characteristics of each web content stored in the content characteristic storage unit 330 and the acquired content characteristics as the Euclidean distance, and estimates a group of content identifiers of web contents having the similarity equal to or lower than a threshold value as a group of similar web contents. Estimating a group of similar content identifiers in this way makes it possible to perform a batch control on a group of similar contents from the control for each content. As an example of batch control, it is conceivable to control a group of similar web contents by a CDN (Content Delivery Network). For some groups of web contents that may be greatly affected by the latency, the use of the CDN makes it possible to suppress the latency in end-to-end and improve the web quality of the group of similar web contents.

Here, the distance calculation method used for calculating the similarity of the content characteristics is not limited to the Euclidean distance, and other distance calculation methods may be used.

Next, a procedure of web quality processing performed by the web quality estimation device 300 according to the third embodiment of the present invention will be described. FIG. 6 is a flowchart illustrating the procedure of the web quality processing procedure performed by the web quality estimation device 300.

Figure 6:
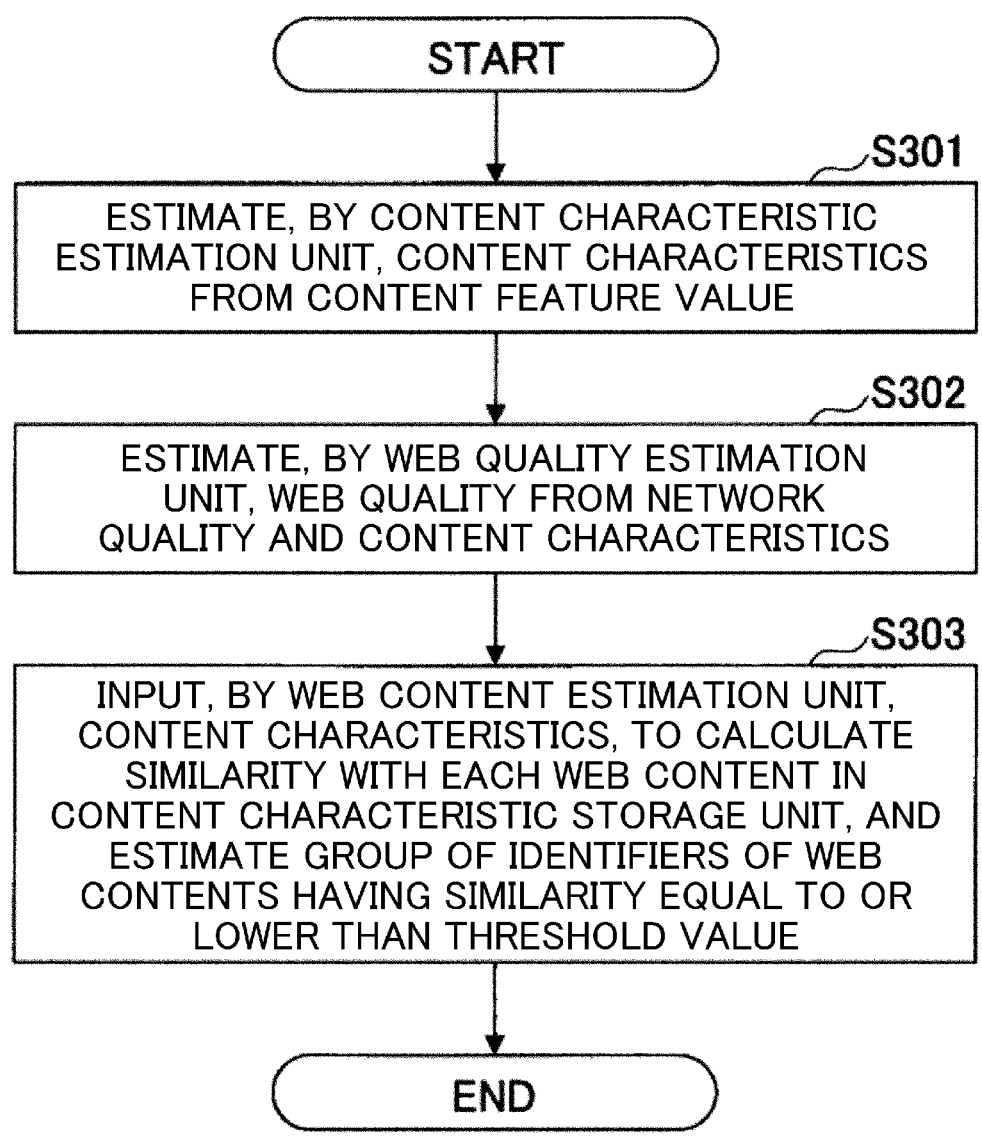
FIG. 6 is a flowchart illustrating web quality estimation processing according to the third embodiment of the present invention.

As illustrated in FIG. 6, in step S301, the content characteristic estimation unit 320 acquires, as input, the content feature value of a web content to be estimated, and estimates one or more content characteristics from the acquired content feature value by using a function stored in advance.

In step S302, when the web quality estimation unit 310 acquires, as input, the one or more content characteristics and one or more network qualities output from the content characteristic estimation unit 320, the web quality estimation unit 310 uses, for example, the above-described equation or the like to estimate web quality.

In step S303, when the similar web content estimation unit 340 acquires, as input, the content characteristics estimated by the content characteristic estimation unit 320, the similar web content estimation unit 340 calculates a similarity between the content characteristics of each web content stored in the content characteristic storage unit 330 and the acquired content characteristics as the Euclidean distance, and estimates a group of content identifiers of web contents having the similarity equal to or lower than a threshold value as a group of similar web contents.

Here, the web quality estimation devices 100, 200, and 300 may each be typically provided as a computing device, and may be configured to include, for example, an auxiliary storage device, a memory device, a processor, an interface device, and a communication device. Various computer programs including programs that implementing the above-described various functions and processing in the web quality estimation devices 100, 200, and 300 may be provided by a recording medium such as a CD-ROM (Compact Disk-Read Only Memory), a DVD (Digital Versatile Disk), or a flash memory. The program may be installed or downloaded to the auxiliary storage device. The auxiliary storage device stores installed programs and also stores necessary files and data. The memory device reads and stores the program and data from the auxiliary storage device in response to a program start instruction. The processor executes various functions and processing of the above-described web quality estimation devices 100, 200, and 300 according to the programs stored in the memory device and various data such as parameters necessary for executing the programs. The interface device is used as a communication interface for connecting to a network or an external device. The communication device performs various communication processing for communicating with a network such as the Internet.

However, the web quality estimation devices 100, 200, and 300 are not limited to the hardware configuration described above, and may be realized by any other appropriate hardware configuration.

Although the examples of the present invention have been described in detail above, the present invention is not limited to the above-mentioned specific embodiments, and various modifications and changes are possible within the spirit and scope of the present invention defined in the claims.

REFERENCE SIGNS LIST 100, 200, 300 Web quality estimation device
110, 210, 310 Web quality estimation unit
120, 330 Content specifying storage unit
220, 320 Content characteristic estimation unit
340 Similar web content estimation unit

The invention claimed is:

1. A web quality estimation device configured to estimate web quality, which is a processing time of a web content, based on input of a content identifier of the web content and one or more network qualities, the web quality estimation device comprising:
   a content characteristic storage medium configured to store correspondence information between a content identifier for identifying each web content included in a plurality of web contents and one or more content characteristics for each web content;
   a web quality estimation unit, including one or more processors, configured to:
      receive i) input of a content identifier of the web content and ii) one or more network qualities,
      refer to the correspondence information to acquire one or more content characteristics corresponding to the input content identifier of the web content, and
      estimate the web quality from i) the one or more content characteristics of the web content and ii) the input one or more network qualities, wherein the one or more content characteristics of the web content are different from the one or more network qualities; and
   a web content estimation unit, including one or more processors, configured to acquire one or more content characteristics as input, calculate a similarity between the one or more content characteristics of each web content stored in the content characteristic storage medium and the acquired content characteristics, and output a group of content identifiers of web contents having the similarity equal to or higher than a threshold value.

2. The web quality estimation device according to claim 1, wherein the one or more network qualities include a network latency, a throughput, a jitter, or a loss.

3. A web quality estimation method for estimating web quality that is a processing time of a web content, based on input of a content feature value of the web content and one or more network qualities, the web quality estimation method comprising:
   estimating one or more content characteristics of the web content from one or more content feature values of the web content;
   estimating the web quality from i) the one or more content characteristics of the web content and ii) the one or more network qualities, wherein the one or more content characteristics of the web content are different from the one or more network qualities;

storing, in a content characteristic storage medium correspondence information between a content identifier for identifying each web content included in a plurality of web contents and one or more content characteristics for each web content; and acquiring one or more content characteristics as input, calculating a similarity between the one or more content characteristics of each web content stored in the content characteristic storage medium and the acquired content characteristics, and outputting a group of content identifiers of web contents having the similarity equal to or higher than a threshold value.

4. The web quality estimation method according to claim 3, wherein the one or more network qualities include a network latency, a throughput, a jitter, or loss, and the content feature value includes a number of javascript, a number of css, a number of images, a number of requests, a number of domains, or a total size.

5. A web quality estimation device configured to estimate web quality which is a processing time of a web content, and a similar web content based on input of a content feature value of the web content and one or more network qualities, the web quality estimation device comprising:

a content characteristic estimation unit, including one or more processors, configured to estimate one or more content characteristics of the web content from one or more content feature values of the web content;

a web quality estimation unit, including one or more processors, configured to estimate the web quality from i) the one or more content characteristics of the web content and ii) the one or more network qualities, wherein the one or more content characteristics of the web content are different from the one or more network qualities;

a content characteristic storage medium configured to store correspondence information between a content identifier for identifying each web content included in a plurality of web contents and one or more content characteristics for each web content; and a web content estimation unit, including one or more processors, configured to acquire one or more content characteristics as input, calculate a similarity between the one or more content characteristics of each web content stored in the content characteristic storage medium and the acquired content characteristics, and output a group of content identifiers of web contents having the similarity equal to or higher than a threshold value.

6. The web quality estimation device according to claim 5, wherein the one or more network qualities include a network latency, a throughput, a jitter, or a loss, and the content feature value includes a number of javascript, a number of css, a number of images, a number of requests, a number of domains, or a total size.

7. A non-transitory computer readable medium storing one or more instructions that causes a processor to function as the units of the web quality estimation device according to claim 5.

8. The non-transitory computer readable medium according to claim 7, wherein the one or more network qualities include a network latency, a throughput, a jitter, or a loss.

* * * * *